United States Patent
Goswami

(10) Patent No.: US 8,224,642 B2
(45) Date of Patent: Jul. 17, 2012

(54) AUTOMATED IDENTIFICATION OF DOCUMENTS AS NOT BELONGING TO ANY LANGUAGE

(75) Inventor: Sauraj Goswami, Palo Alto, CA (US)

(73) Assignee: Stratify, Inc., Mountain View, CA (US)

(*) Notice: Subject to any disclaimer, the term of this patent is extended or adjusted under 35 U.S.C. 154(b) by 903 days.

(21) Appl. No.: 12/275,027

(22) Filed: Nov. 20, 2008

(65) Prior Publication Data
US 2010/0125448 A1    May 20, 2010

(51) Int. Cl.
*G06F 17/20*    (2006.01)

(52) U.S. Cl. ......... 704/8; 704/1; 704/9; 704/10; 704/2; 704/3

(58) Field of Classification Search ............. 704/8, 9, 704/1, 10, 2, 3
See application file for complete search history.

(56) References Cited

U.S. PATENT DOCUMENTS

| | | | |
|---|---|---|---|
| 6,002,998 A | 12/1999 | Martino et al. | |
| 6,047,251 A | 4/2000 | Pon et al. | |
| 6,064,767 A | 5/2000 | Muir et al. | |
| 6,157,905 A | 12/2000 | Powell | |
| 6,167,369 A | 12/2000 | Schulze | |
| 6,182,099 B1 | 1/2001 | Nakasato | |
| 6,272,456 B1 | 8/2001 | de Campos | |
| 6,519,557 B1 | 2/2003 | Emens et al. | |
| 7,664,629 B2 * | 2/2010 | Dymetman et al. | 704/4 |
| 7,912,700 B2 * | 3/2011 | Bower et al. | 704/9 |
| 2001/0056348 A1 | 12/2001 | Hyde-Thompson et al. | |
| 2002/0184003 A1 | 12/2002 | Hakkinen et al. | |
| 2003/0009324 A1 | 1/2003 | Alpha | |
| 2004/0006457 A1 | 1/2004 | Dehlinger et al. | |
| 2004/0006467 A1 | 1/2004 | Anisimiovich et al. | |
| 2004/0039563 A1 | 2/2004 | Suzuki | |
| 2004/0078191 A1 | 4/2004 | Tian et al. | |
| 2005/0044495 A1 * | 2/2005 | Lee et al. | 715/533 |
| 2005/0154578 A1 | 7/2005 | Tong et al. | |
| 2005/0268233 A1 | 12/2005 | Perla et al. | |
| 2006/0184357 A1 | 8/2006 | Ramsey et al. | |
| 2006/0229865 A1 * | 10/2006 | Carlgren et al. | 704/8 |
| 2007/0124132 A1 | 5/2007 | Takeuchi | |
| 2008/0147380 A1 | 6/2008 | Barliga et al. | |
| 2010/0082349 A1 * | 4/2010 | Bellegarda et al. | 704/260 |
| 2010/0125447 A1 * | 5/2010 | Goswami | 704/8 |

OTHER PUBLICATIONS

Nandakumar et al., "Likelihood Ratio Based Biometric Score Fusion," IEEE Trans. Pattern Analysis & Machine Intelligence, v.30, n. 2, (Feb. 2008), pp. 342-347.

* cited by examiner

Primary Examiner — Qi Han

(57) ABSTRACT

An "impostor profile" for a language is used to determine whether documents are in that language or no language. The impostor profile for a given language provides statistical information about the expected results of applying a language model for one or more other ("impostor") languages to a document that is in fact in the given language. After a most likely language for a test document is identified, the impostor profile is used together with the scores for the test document in the various impostor languages to determine whether to identify the test document as being in the most likely language or in no language.

32 Claims, 5 Drawing Sheets

AUTOMATED IDENTIFICATION OF DOCUMENTS AS NOT BELONGING TO ANY LANGUAGE

BACKGROUND OF THE INVENTION

The present invention relates in general to automated language identification techniques and in particular to automated identification of documents as not belonging to any language.

With the proliferation of computing devices and communication networks such as the Internet, an ever increasing amount of information is stored in the form of electronic documents. Such documents might be generated using application software such as word processing programs, e-mail programs, web page development tools, etc. Electronic documents can also be generated by scanning paper documents and employing optical character recognition ("OCR") or other techniques to create an electronic representation of the content.

It is often necessary to search through a large collection of electronic documents to find information relevant to a particular question. For example, a number of search services provide interfaces via which users can search electronic documents that are accessible via the World Wide Web. In another context, discovery in civil litigation usually involves the production of massive quantities of electronic documents that the receiving party must sift through.

Electronic documents can exist in any human language, and search processes are greatly facilitated if the language of a document is known. For example, in the case of Asian languages, parsing the document into words is non-trivial as most Asian languages do not include a space character between words. Thus, it is helpful to determine which language such documents are in so that they can be correctly parsed into words. As another example, a character string or word might have different meanings in different languages, and search results are generally improved if the language of the documents is known.

A number of automated techniques have been developed to identify the language of a document. Many of these techniques fall into two categories: dictionary-based and n-gram based. In dictionary-based language identification, a "dictionary" is assembled for each of a number of candidate languages, often by analyzing training documents known to be in that language. The document is parsed into "words" (e.g., based on word-break indicators such as space characters and/or punctuation characters), and a frequency analysis is performed on the words to develop a frequency profile for the language. The dictionary for each language can be limited to a relatively small number of commonly occurring words (often short words, e.g., 5 characters or fewer) in that language. The language of an unknown document is determined by parsing the unknown document into words and determining a frequency profile for the unknown document. This frequency profile for the unknown document is compared to the profiles for the various candidate languages, and the language with the best match is identified as the language of the document. Dictionary-based techniques can work well for western languages but often fail with Asian languages, since the documents cannot be reliably parsed into words until the language is known.

In n-gram based language identification, the document is parsed into n-character units for some integer n, rather than into words. Typically, n is chosen to be a small number such as 2 or 3, and the n-grams overlap; thus, for example, the word "patent" can be parsed into bigrams (i.e., n-grams with n=2) as "_p", "pa", "at", "te", "en", "nt", "t_", where "_" denotes the space character. Using a set of training documents in each candidate language, an n-gram frequency profile can be developed for each candidate language. The language of an unknown document can be determined by analyzing the frequency of n-grams in the document and comparing to the frequency profiles of the candidate languages. Using n-grams, particularly bigrams, can significantly reduce the size of the language model, as there are typically fewer possible bigrams than words in a given language. In addition, n-gram analysis does not require prior knowledge of where the word boundaries are, making it particularly suitable for analyzing Asian languages.

Both techniques have usually assumed that the unknown document is in a natural language (which means, generally, a language as developed and used by human beings). In reality, some documents are not in any natural language. For example, program source code or computer scripts are generally written in a specialized computer language that may use words from a natural language but does not employ the grammar or syntax of natural language. Likewise, address lists, spreadsheets, and other data-oriented documents may be said to be in no natural language. Documents that are not in a natural language are referred to herein as "junk" documents. It is to be understood that such documents are "junk" only in the sense that they should not be identified as belonging to any natural language; the documents themselves may be of considerable value to particular searchers or reviewers of documents.

In related fields, there has been some interest in detection of unwanted messages (referred to as "spam") in e-mail and in comments posted by users on interactive websites such as blogs. Detection techniques for e-mail spam generally rely on features such as source IP address, presence of suspect keywords, and the overall distribution of words, rather than language modeling. Some detection techniques for "comment spam" do rely on comparing a language model derived from the content being commented on with a language model derived from the comment itself. Such comparisons, however, may result in the rejection of legitimate comments (e.g., if the comment uses different words from the original content). They also do not consider the possibility of multilingual content and/or comments, which would also result in diverging language models. Further, these techniques would not distinguish between a comment that was in a different natural language from the original content and a comment that was not in a natural language at all.

BRIEF SUMMARY OF THE INVENTION

To date, the problem of distinguishing content in a natural language from content not in a natural language (i.e., junk) has received little attention. Embodiments of the present invention provides techniques for automatically identifying documents that are likely to be junk documents. As noted above, the term "junk" in this context simply means that the documents are not in a natural language and is not intended to imply anything about the quality or usefulness of the documents for any particular purpose.

Identification of junk documents in accordance with an embodiment of the present invention makes use of an "impostor profile" for each of the candidate languages L. The impostor profile for a candidate language L provides statistical information about the expected results of applying a language model for an "impostor" language M (i.e., a language other than L) to a document that is in fact in language L. In principle, if a test document is in fact in language L, then applying the impostor language models should produce results consistent with the expected results. If the results of applying the impostor language models diverge significantly from the expected results, then a document is less likely to actually be in the language L.

Accordingly, some embodiments of the present invention apply various candidate language models to identify a most likely language ($L_0$) for a document and further use the results of applying the language models for one or more impostor languages associated with the language $L_0$ to determine whether the document should be identified as a junk document or a document in language $L_0$. For example, a language model for a language L can be used to determine a score for a document, where the score reflects the probability that the document is in language L, and comparing scores generated for the same test document using models for different languages can yield an inference as to the most likely language $L_0$ for the test document. The impostor profile for the most likely language $L_0$ is then considered. For instance, an "impostor score" generated for the test document using the language model of an impostor language M can be compared to a statistical distribution of scores generated from documents known to be in language $L_0$ using the model for the impostor language M. If the impostor score is consistent with the statistical distribution, then the hypothesis that the test document is in language $L_0$ is strengthened; if not, it is weakened. An impostor profile can include multiple impostor languages that can be used separately or in combination to strengthen or weaken the hypothesis. Ultimately, if the hypothesis that the test document is in language $L_0$ is sufficiently weakened by considering the impostor profile, the test document can be identified as junk.

One aspect of the invention relates to a method for identifying documents as not belonging to any language in some set of candidate languages where each candidate language has an associated language model. For each of the candidate languages, a document score is computed for a test document using the language model of that candidate language. A most likely language for the test document is selected based on the respective document scores for each of the candidate languages. An impostor profile for the most likely language is accessed; this impostor profile includes a parameter set consisting of values characterizing a score distribution expected for documents in the most likely language when scored using the respective language models of one or more impostor languages in an impostor set associated with the most likely language. The document scores for the one or more impostor languages in the impostor set are compared to the impostor profile for the most likely language, and based at least in part on this comparison, it is determined whether the test document is in the most likely language or in no language. The result of the determination can be stored as language information for the test document in a computer-readable storage medium.

Another aspect of the invention relates to a computer readable storage medium encoded with program code usable to control operation of a computer system. The program code includes program code for computing, for each language in some set of candidate languages, a document score for a test document using a language model associated with that language and program code for selecting a most likely language from the candidate languages based on the document scores for each of the candidate languages. The program code also includes program code for determining whether the test document is in the most likely language or in no language, with the determination being based at least in part on comparing the document scores for one or more impostor languages in an impostor set associated with the most likely language to an impostor profile for the most likely language. The impostor profile for the most likely language includes a parameter set consisting of values characterizing a score distribution expected for documents in the most likely language when scored using the respective language models of the one or more impostor languages in the impostor set associated with the most likely language.

Another aspect of the invention relates to a computer system with a language model data store and control logic coupled to the language model data store. The language model data store is configured to store language models corresponding to a number of languages, with each language model including information usable to determine a score reflecting a probability that a document is in the language corresponding to that language model. The language model data store is also configured to store an impostor profile associated with each of the languages, wherein the impostor profile for a particular language includes a parameter set consisting of values characterizing a score distribution expected for documents in that language when scored using the respective language models of one or more impostor languages in an impostor set associated with that language. The control logic is configured to compute, for at least some of the languages, a document score for a test document, with the document score being computed based on at least some of the language models stored in the language model data store, and to select a most likely language for the test document based on the computed document scores; document scores are also computed for the impostor languages in the impostor set associated with the most likely language. The control logic is also configured to compare the document scores computed for the impostor languages in the impostor set associated with the most likely language to the impostor profile for the most likely language and to determine whether the test document is in the most likely language or in no language based at least in part on a result of comparing the document scores.

The following detailed description together with the accompanying drawings will provide a better understanding of the nature and advantages of the present invention.

DETAILED DESCRIPTION OF THE INVENTION

Embodiments of the present invention provide techniques for automatically identifying documents that are likely to be junk documents. The term "junk" as used herein simply means that the documents are not in a natural language and is not intended to imply anything about the quality or usefulness of the documents for any particular purpose.

Identification of junk documents in accordance with an embodiment of the present invention makes use of an "impostor profile" for each of the candidate languages L. The impostor profile for a candidate language L provides statistical information about the expected results of applying a language model for an "impostor" language M (i.e., a language other than L) to a document that is in fact in language L. In principle, if a test document is in fact in language L, then applying the impostor language models should produce results consistent with the expected results. If the results of applying the impostor language models diverge significantly from the expected results, then a document is less likely to actually be in the language L.

Accordingly, some embodiments of the present invention apply various candidate language models to identify a most likely language ($L_0$) for a document and further use the results of applying the language models for one or more impostor languages associated with the language $L_0$ to determine whether the document should be identified as a junk document or a document in language $L_0$. For example, a language model for a language L can be used to determine a score for a document, where the score reflects the probability that the document is in language L, and comparing scores generated for the same test document using models for different languages can yield an inference as to the most likely language $L_0$ for the test document. The impostor profile for the most likely language $L_0$ is then considered. For instance, an "impostor score" generated for the test document using the language model of an impostor language M can be compared to a statistical distribution of scores generated from documents known to be in language $L_0$ using the model for the impostor language M. If the impostor score is consistent with the statistical distribution, then the hypothesis that the test document is in language $L_0$ is strengthened; if not, it is weakened. An impostor profile can include multiple impostor languages that can be used separately or in combination to strengthen or weaken the hypothesis. Ultimately, if the hypothesis that the test document is in language $L_0$ is sufficiently weakened by considering the impostor profile, the test document can be identified as junk.

System Overview

Figure 1:
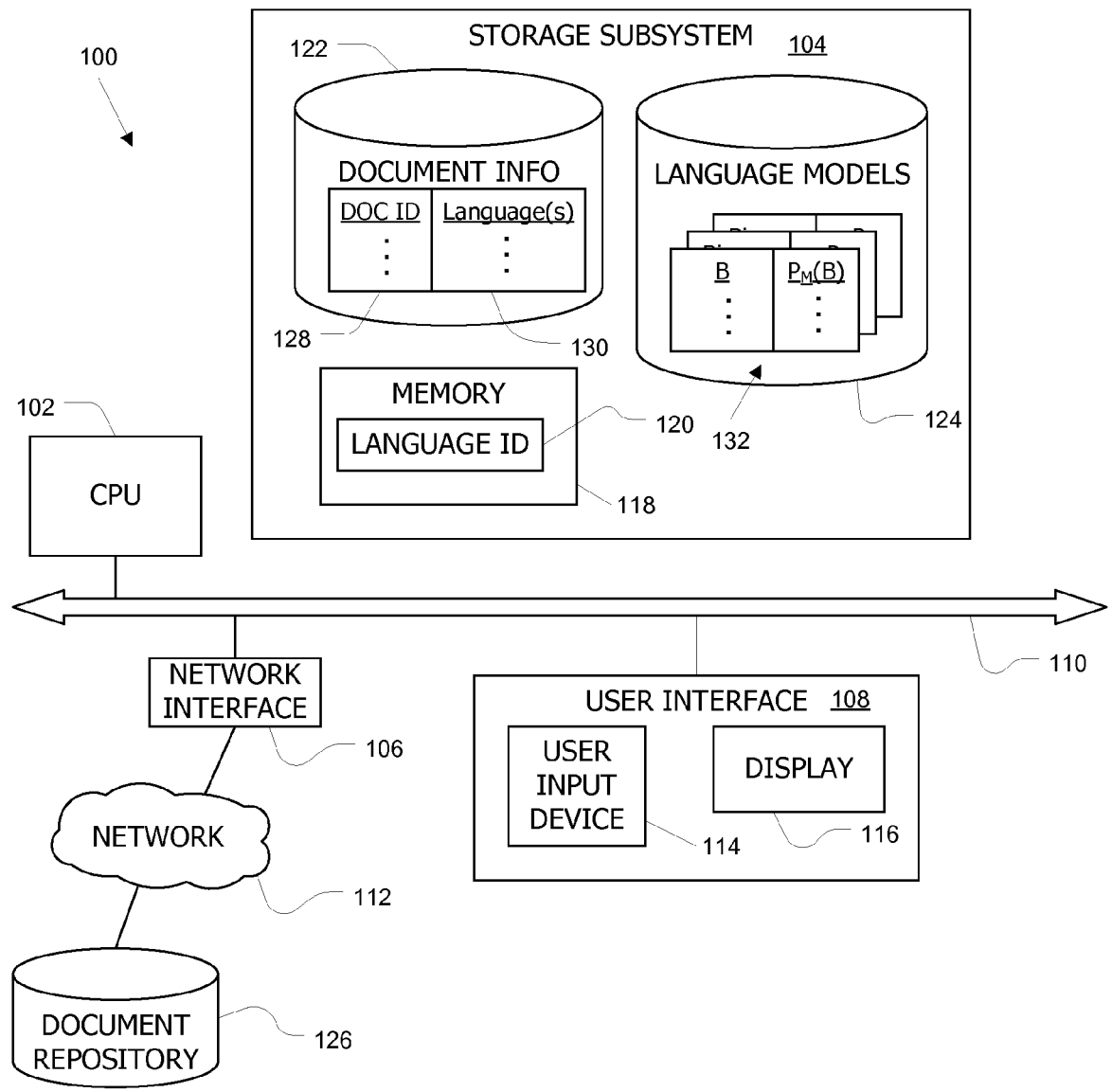
FIG. 1 is a block diagram of a computer system according to an embodiment of the present invention.

FIG. 1 is a block diagram of a computer system 100 according to an embodiment of the present invention. Computer system 100 includes a CPU 102, storage subsystem 104, network interface 106, and user interface 108 connected via a bus 110. CPU 102 can be, e.g., any programmable general-purpose processor. Network interface 106 provides access to one or more other computer systems via a network 112, which can include, e.g., a local area network (LAN), wide area network (WAN), the Internet (a globally interconnected network of computer networks), virtual private network, and so on. Network interface 106 can be implemented using standard protocols, including wired protocols (e.g., Ethernet) and/or wireless protocols (e.g., any IEEE 802.11 protocol). User interface 108 can include one or more standard input devices 114 such as a keyboard, mouse, touch screen, touch pad, etc., and one or more standard output devices such as a display 116. Bus 110 can be implemented using conventional bus architectures and may include bridges, bus controllers, and the like.

Storage subsystem 104 provides storage for programs and data accessed by CPU 102 and/or other components of computer system 100. In the embodiment shown, storage subsystem 104 includes primary memory 118. Primary memory 118 provides the fastest access times and can be implemented using known memory technologies such as DRAM (dynamic random access memory) and/or SRAM (static random access memory). Primary memory 118 is advantageously used at any given time to store programs and/or data that are actively in use by CPU 102. Thus, for example, memory 118 is shown as storing a language identification program 120 that, when executed, can cause CPU 102 to perform language identification operations as described below.

Storage subsystem 104 in this embodiment also provides secondary storage areas, which can include, e.g., magnetic media such as conventional hard or floppy disks, optical media such as compact disc (CD), digital versatile disc (DVD), or the like, and/or semiconductor media such as flash memory. Secondary storage areas generally have longer access time than primary memory 118 but have larger storage capacity. In this example, secondary storage areas are provided for a document information database 122 and a language model database 124.

Document information database 122 provides information (also referred to as metadata) about a corpus of documents. As used herein, a corpus of documents can be any collection of documents about which information is to be provided to a user of system 100. In one embodiment, the corpus of documents (or a portion thereof) can be stored in a document repository 126 that is remote from computer system 100 and accessible via network interface 106 and network 112. In another embodiment, the corpus (or a portion thereof) can be stored locally. The corpus can be centralized or distributed (e.g., it can be a collection of web documents that are stored on respective web servers connected to network 112 as is known in the art) as desired, and document information database 122 might or might not contain the actual documents.

Document information database 122 advantageously contains identifying information (Doc ID 128) for each document in the corpus. This information can include, e.g., a unique reference to a location where the document is stored. Associated with each document is language information 130 indicating the language(s) associated with the document; language information 130 can also include an indication that the document has been identified as junk (i.e., not in any language). In accordance with an embodiment of the present invention, language information 130 can be populated by executing language identification program 120 on CPU 102. Document information database 122 can also include any other information about the document, such as dates of creation, editing, and/or addition to the corpus; type of document (e.g., e-mail, web page, word processor document); author; source or location from which the document was obtained; a condensed representation of document content in a readily searchable form; keywords; categorization information; and so on.

Language model database 124 in this embodiment provides a bigram model 132 for each of some number of candidate languages. Bigram model 132 for a given language (M) identifies some (or all) of the bigrams B that occur in that language, and for each bigram B, an associated probability $P_M(B)$ of bigram B occurring in language M. In one embodiment, if bigram B is made up of characters $b_1 b_2$, then probability $P_M(B)$ is defined as the conditional probability that, in language M, the character following $b_1$ is $b_2$ as opposed to some other character. That is, $P_M(B)=P_M(b_2|b_1)$. The language model may also include a single-character probability $P_M(b_i)$ for each possible character $b_i$ in language M. The language model for language M may be developed, e.g., by analyzing a large number (e.g., several thousand) of "training" documents that are known in advance to be entirely written in language M. The data extracted from the training documents can be used to define the probabilities $P_M(B)$ for particular bigrams B and to determine which bigrams B occur in language M with sufficient frequency to be useful for language identification. In some embodiment, the language model includes bigram probability information for only a subset of bigrams B that occur in the language. Models can be provided for any number of languages.

In one embodiment, each possible character is represented using a standard character code scheme such as the well known 16-bit Unicode Transformation Format (UTF-16) encoding, and each possible bigram is represented as a pair of characters in the standard character code scheme. In one embodiment, bigram data for a candidate language is stored as an array or lookup table indexed by the pair of codes representing the bigram in the standard character coding scheme; each entry provides the probability of the bigram occurring in the candidate language. Lookups for the same bigram can be carried out in parallel on arrays or lookup tables corresponding to different candidate languages. In another embodiment, the bigram probability for a given bigram across all candidate languages can be stored as a vector with each component representing the probability of occurrence of that bigram in one of the candidate languages. Storing the bigram probability as a vector, while not required, allows the probability of a particular bigram to be looked up in parallel for all candidate languages. Similarly, the single-character probability for a given character across all candidate languages can also be stored as a vector to facilitate faster lookup.

It will be appreciated that computer system 100 is illustrative and that variations and modifications are possible. For example, although storage subsystem 104 is shown as local to system 100, in alternative embodiments, all or part of storage subsystem 104 can be implemented as remote storage, e.g., on a storage area network (SAN) or other remote server accessible via network 112. Thus, for example, document information database 122 and/or language model database 124 can be stored locally or remotely as desired. Further, although a language identification program is shown as residing in primary memory 118, the invention is not limited to any particular mechanism for supplying program instructions for execution by CPU 102. For instance, at any given time some or all of the program instructions for language identification program 120 may be present within CPU 120 (e.g., in an on chip instruction cache and/or various buffers and registers), in a page file or memory mapped file on a system disk, and/or in other local or remote storage space. In some embodiments, computer system 100 might be implemented as a server accessible to a user via a network, and user interface 108 is optional. Computer system 100 may also include additional components such as floppy disk drives, optical media drives (e.g., CD or DVD), network interface components, USB interface, and the like. Computer system 100 can be configured with many different hardware components and can be made in many dimensions and styles (e.g., laptop, tablet, server, workstation, mainframe); network connections may be provided via any suitable transport media (e.g., wired, optical, and/or wireless media) and any suitable communication protocol (e.g., TCP/IP). A particular computer architecture or platform is not critical to the present invention.

Overview of Bigram-Based Language Analysis

Embodiments described herein use a bigram-based language analysis technique. As noted above, in a bigram-based language model, each character $c_i$ has a probability $P_M(c_i)$ of occurring and a bigram B made up of consecutive characters $C_iC_{i+1}$ has a conditional probability $P_M(B)=P_M(c_{i+1}|c_i)$ of occurring. Thus, if the content of a document D is represented as a character string $c_0c_1c_2 \ldots c_{n-1}$, where n is the number of characters in document D, then the probability that document D is in language M can be defined as:

$$P_M(D) = P_M(c_0) * \prod_{i=1}^{n-1} P_M(c_i | c_{i-1}). \quad (1)$$

The language model M that yields the highest probability $P_M(D)$ can be identified as the most likely language of the document.

An alternative technique uses the logarithm of the reciprocal of Eq. (1) to define a score for the document. Thus, the score $S_M(D)$ for document D under language model M can be defined as:

$$S_M(D) = \log\left[\frac{1}{P_M(c_0)}\right] + \sum_{i=1}^{n-1} \log\left[\frac{1}{P_M(c_i | c_{i-1})}\right]. \quad (2)$$

Any convenient base, e.g., base 2 or base 10, can be used for the logarithm. The score $S_M(D)$ decreases with increasing probability $P_M(D)$, so the language with the lowest score $S_M(D)$ can be identified as the most likely language of the document. Assuming the same probabilities are used, Eq. (2) yields the same outcomes as Eq. (1) (i.e., under either scoring model, the same language would have the best score for document D) but is computationally faster for existing computer systems, as it replaces the multiplications of Eq. (1) with additions. Eq. (2) also avoids underflow problems that can occur when numbers less than 1 are multiplied. In some implementations, the bigram language models in database 124 of FIG. 1 can store the logarithm of the reciprocal of the probability of a bigram (i.e., log [1/P] for probability P) rather than the probability itself, allowing Eq. (2) to be computed using only lookup and addition operations.

It should be noted that certain bigrams have zero probability of occurrence in some languages. For instance bigram "qx" does not occur in English; likewise, bigrams made up of Japanese or Chinese characters do not occur in English. In Eq. (2), a zero in the denominator would cause problems. In addition, as described above, the language model for a particular language might not include all possible bigrams for that language. Accordingly, it can be useful to define a default probability (e.g., $P_M(\text{Default})=2^{-15}$) and assign this default probability to any bigram having a lower probability of occurring or to any bigram not represented in the language model. (Bigrams with the default probability are referred to herein as "default bigrams.") The same default probability is advantageously used for each language model. In one embodiment, default bigrams are not represented in the language models; if a lookup for bigram B in the model for language M fails, it is inferred that $P_M(B)$ is the default probability.

Regardless of whether Eq. (1) or Eq. (2) is used for scoring, it can be useful to apply a threshold such that if the most probable language is insufficiently probable, the document is identified as having no language. This will reduce false positives. In the case of Eq. (1), the threshold will be a minimum value; in the case of Eq. (2), a maximum value. The threshold is advantageously defined as a function of the number of characters (or bigrams) in the document. For example, using Eq. (2), a normalized score $\hat{S}_M(D)$ can be defined as:

$$\hat{S}_M(D) = S_M(D)/n, \quad (3)$$

where n is the number of characters in document D. Using a set of training documents known to be in language M, a mean normalized score $\mu_M$ and standard deviation $\sigma_M$ across the training set can be determined, and the threshold can be defined as:

$$T_M = \mu_M + k\sigma_M. \qquad (4)$$

The parameter k can be adjusted to optimize the balance between false positives (i.e., instances where a document not actually in the most probable language M is mistakenly identified as being in M; such documents might or might not be junk documents) and false negatives (i.e., instances where a document actually in the most probable language M is mistakenly identified as not being in any language) as desired. Usually a value of 3 or above is desirable, although many false positives will occur.

The above analysis technique is based on the assumption that a document is in some natural language. Embodiments of the present invention further test a hypothesis that the document is not in the most probable language but is instead a junk document. As described below, this hypothesis can be tested by considering scores for several of the candidate languages other than the most probable language.

Detection of Junk Documents

Figure 2:
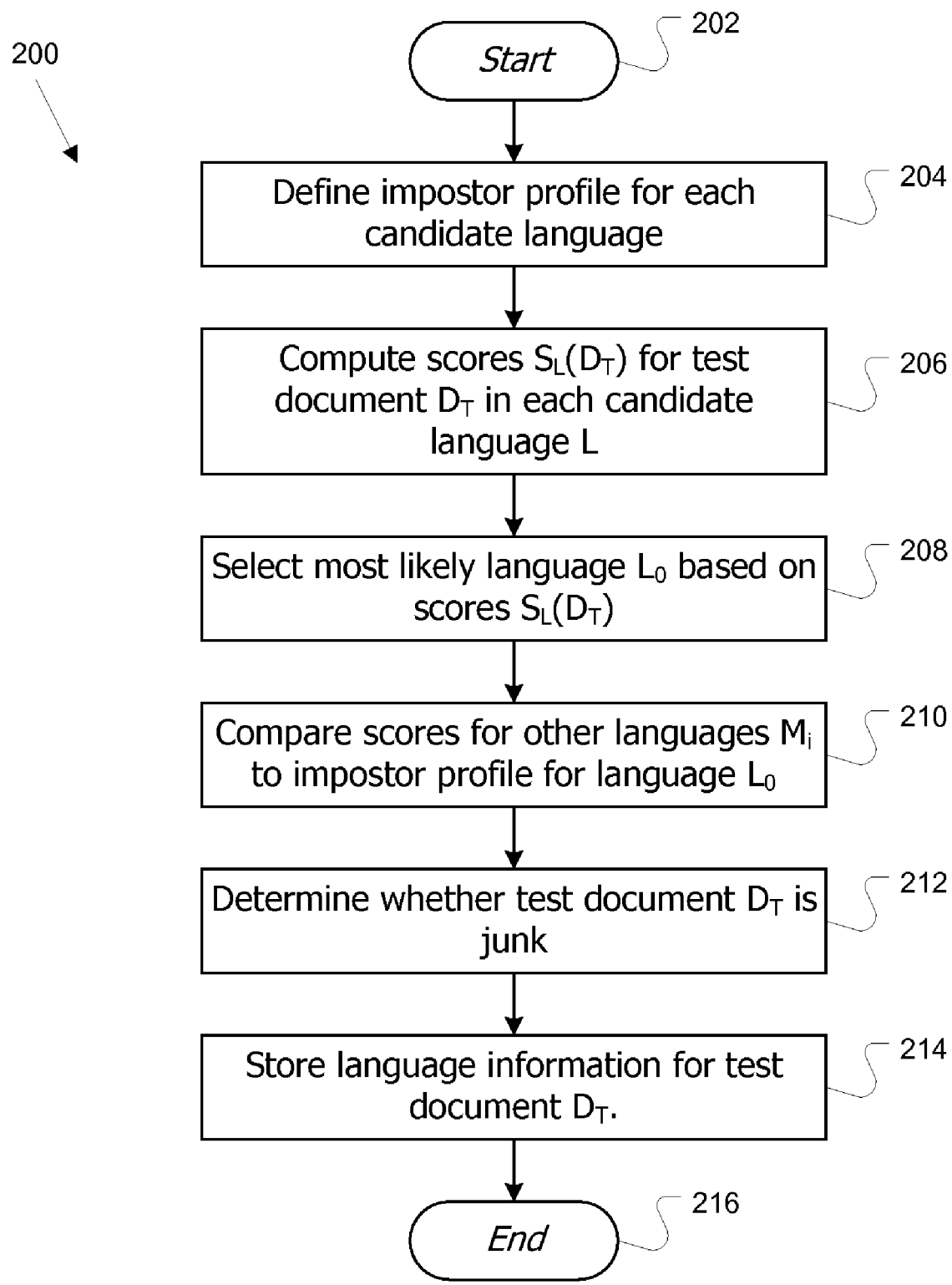
FIG. 2 is a flow diagram of a process for detecting junk documents according to an embodiment of the present invention.

FIG. 2 is a flow diagram of a process 200 for detecting junk documents according to an embodiment of the present invention. Process 200 starts (block 202) in a training phase, which may be performed during or after generation of language models for the candidate languages and prior to analysis of documents in unknown languages. During the training phase, at step 204, an "impostor profile" for each candidate language is defined. The impostor profile for a candidate language L provides information about the statistical distribution of scores for documents known to be in language L when scored under the model for one or more different languages M. For example, the impostor profile for language L can provide a mean and standard deviation of the scores of a training set of documents known to be in language L when scored using the models for each of various other languages M.

Figure 3:
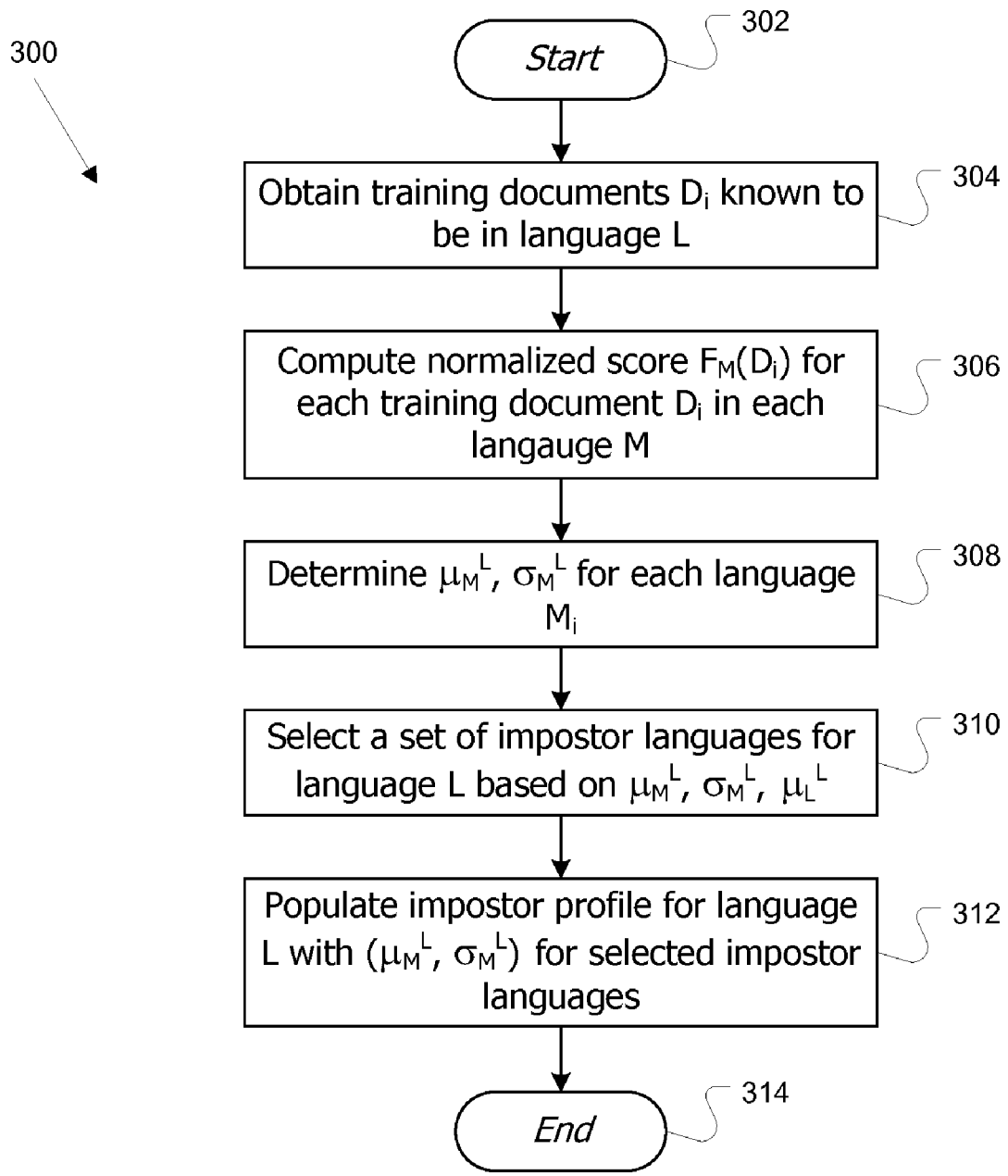
FIG. 3 is a flow diagram of a process for defining an impostor profile for a language according to an embodiment of the present invention.

By way of example, FIG. 3 is a flow diagram of a process 300 for defining an impostor profile for a language L according to an embodiment of the present invention. This process can be used at step 204 of process 200. Process 300 starts (block 302) with obtaining a set of training documents $D_i$ (where i is an index that ranges from 1 to the number of training documents, Q) known to be in candidate language L. (The language of a training document can be determined, e.g., by manual review, as is known in the art.) The set of training documents advantageously includes a large number Q of documents, e.g., several thousand documents. Any documents known to be in language L can be used. In some embodiments, the types of documents likely to be analyzed are known in advance, and the training documents can be selected to be representative of such documents, but this is not required.

At step 306, a normalized score $\hat{S}_M(D_i)$ is computed for each training document $D_i$ in each candidate language M. For example, either of the scoring techniques described above can be used. At step 308, for each language M, a mean $\mu_M^L$ and standard deviation $\sigma_M^L$ are determined according to:

$$\mu_M^L = \frac{1}{Q} \sum_{i=1}^{Q} \hat{S}_M(D_i); \qquad (5)$$

and $$\sigma_M^L = \sqrt{\frac{1}{Q} \sum_{i=1}^{Q} \left( \hat{S}_M(D_i) - \mu_M^L \right)^2}. \qquad (6)$$

It should be noted that step 308 advantageously includes computing the mean and standard deviation for the case where M=L (i.e., for the actual language of the document) as well as for the other candidate languages M.

At step 310, a set I(L) of impostor languages for language L is selected. While all languages other than L can be included in the impostor set, it has been found that a smaller impostor set (e.g., 4 or 5 languages) is generally sufficient for the techniques described herein. In one embodiment, languages are selected for the impostor set based on a degree of closeness, such as how closely the mean score $\mu_M^L$ for the impostor language M matches the mean score for language L ($\mu_L^L$). Closeness of match can be defined by reference to the standard deviation $\sigma_M^L$ for the particular impostor language rather than just the difference in the means. For instance, the degree of closeness can be defined as $$C_M^L = |\mu_M^L - \mu_L^L| / \sigma_M^L, \qquad (7)$$

and languages M with the smallest $C_M^L$ can be added to the impostor set for language L. The number of languages included in the impostor set can be capped at some fixed maximum number (R) (e.g., 4 or 5) or at some limit on degree of closeness (e.g., a maximum value of $C_M^L$) or at whichever of these limits is reached first.

In some embodiments, certain languages can be excluded from the impostor set for language L if they are unlikely to yield useful information. For instance, if two languages L and M have non-overlapping character sets, analysis based on language M is unlikely to yield useful information about the likelihood that a document is in language L. Thus, for example, the impostor set for English might include German and Spanish but exclude Russian, Arabic, and Japanese.

At step 312, the impostor profile (denoted T(L)) for language L is populated with the statistics ($\mu_{Mi}^L$, $\sigma_{Mi}^L$) for each language $M_i$ in impostor set I(L). Thereafter, process 300 ends (block 314).

Process 300 can be repeated (or performed in parallel) for each candidate language L for which a model exists. Thus, referring again to FIG. 2, upon completion of step 204, each candidate language L would have a corresponding set I(L) of impostor languages and a statistical impostor profile T(L) that provides values (e.g., mean and standard deviation) characterizing the expected score distributions for documents in language L scored using the respective models for each language in I(L).

At step 206, a test document $D_T$ is scored. A normalized score $\hat{S}_L(D_T)$ is computed for each candidate language L. Any of the scoring techniques described above or other likelihood-based scoring techniques can be used.

At step 208, a most likely language $L_0$ is identified based on the scores obtained at step 206. If the scoring model of Eq. (1) is used, the most likely language would have the highest score; for the scoring model of Eq. (2), the most likely language would have the lowest score. In some embodiments, a threshold test can be applied as described above. For example, for the scoring model of Eq. (2), if the best score is above a threshold (defined, e.g., according to Eq. (4)), then the document can be identified as junk (i.e., not in any language) based solely on this result.

However, process 200 also provides further ability to identify junk documents. Specifically, at step 210, the scores for test document $D_T$ in languages $M_i$ that are in the impostor set $I(L_O)$ for the most likely language $L_O$ are compared to the impostor profile $T(L_O)$. In theory, a document that is truly in language $L_O$ should have scores in the impostor languages that fall within the statistical distribution for such documents. Thus, documents that fall too far outside the impostor score distributions for language $L_O$ can be identified as junk (step 212).

Figure 4A:
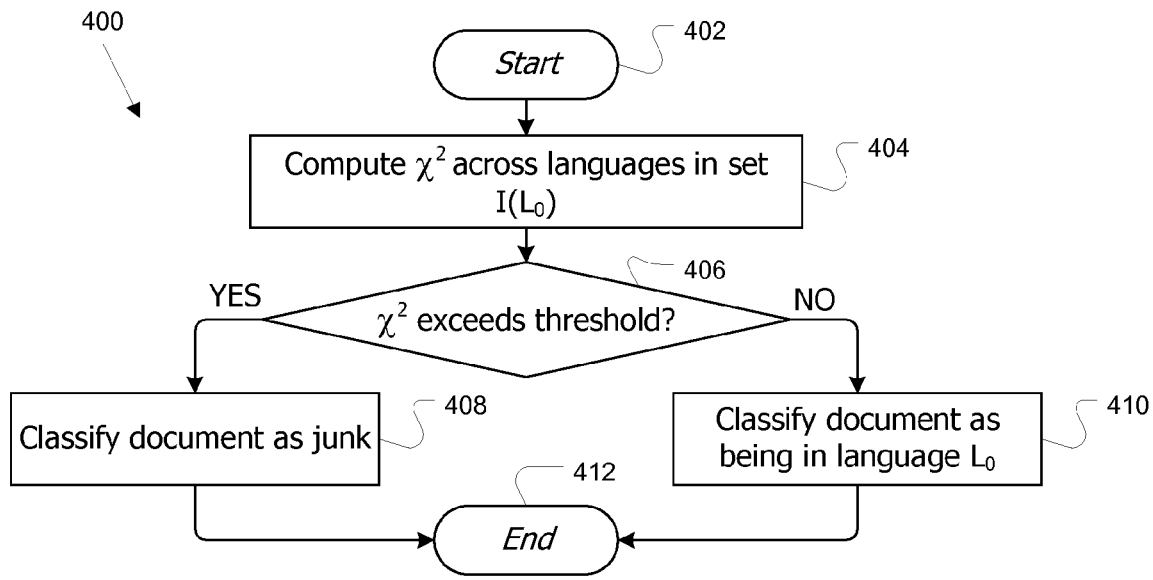
FIGS. 4A-4C are flow diagrams illustrating processes for determining whether a document is junk according to various embodiments of the present invention.

The comparison and determination of whether a document is junk (steps 210 and 212) can be made in a number of ways. For example, FIG. 4A is a flow diagram illustrating a first process 400 for determining whether a document is junk according to an embodiment of the present invention. Process 400 starts (block 402) at step 404, where a chi-square statistic is computed across the languages in impostor set $I(L_O)$ for the most likely language $L_O$, e.g., according to:

$$\chi^2 = \sum_{i=1}^{R} \left( \frac{\hat{S}_{Mi}(D_T) - \mu_{Mi}^{L0}}{\sigma_{Mi}^{L0}} \right)^2, \quad (8)$$

where the sum is taken over the R languages in impostor set $I(L_O)$.

At step 406, the result of Eq. (8) is compared to a threshold value for a chi-square distribution with R degrees of freedom. The threshold value can be defined, e.g., as corresponding to a 99% confidence level or another level as desired. (In general, lower thresholds will result in more documents being identified as junk.)

At step 408, if the $\chi^2$ result of Eq. (8) exceeds the threshold, then the document is classified as junk. Otherwise, at step 410, the document is classified as being in the most likely language $L_O$. Process 400 ends (block 412).

Figure 4B:
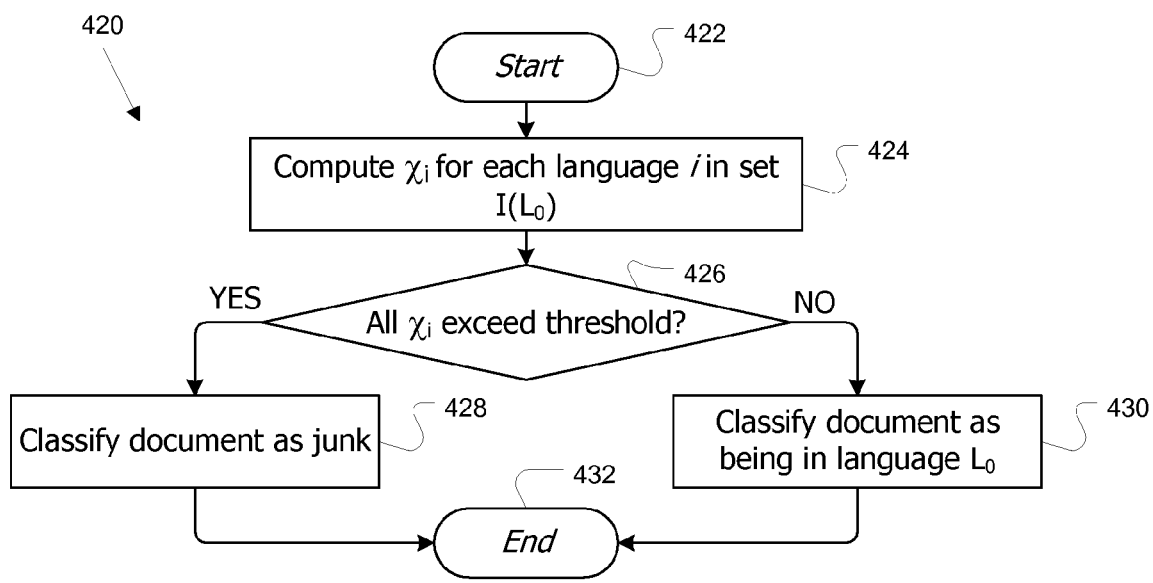

An alternative embodiment uses a variation of the Bonferroni type test. FIG. 4B is a flow diagram of a process 420 for determining whether a document is junk according to another embodiment of the present invention. Process 420 starts (block 422) with step 424, where a likelihood statistic $\chi_i$ is computed separately for each language $M_i$ in impostor set $I(L_O)$ for the most likely language $L_O$, e.g., according to:

$$\chi_i = \frac{\hat{S}_{Mi}(D_T) - \mu_{Mi}^{L0}}{\sigma_{Mi}^{L0}}. \quad (9)$$

At step 426, the result of Eq. (9) for each language $M_i$ is separately compared to a threshold value. In one embodiment, a threshold value of 5 is used; a different threshold can be set if desired. (In general, lower thresholds will result in more documents being identified as junk.)

At step 428, if the result of Eq. (9) for every language $M_i$ in impostor set $I(L_O)$ exceeds the threshold, then the document is classified as junk. Otherwise, at step 430, the document is classified as being in the most likely language $L_O$. Process 420 ends (block 432).

Figure 4C:
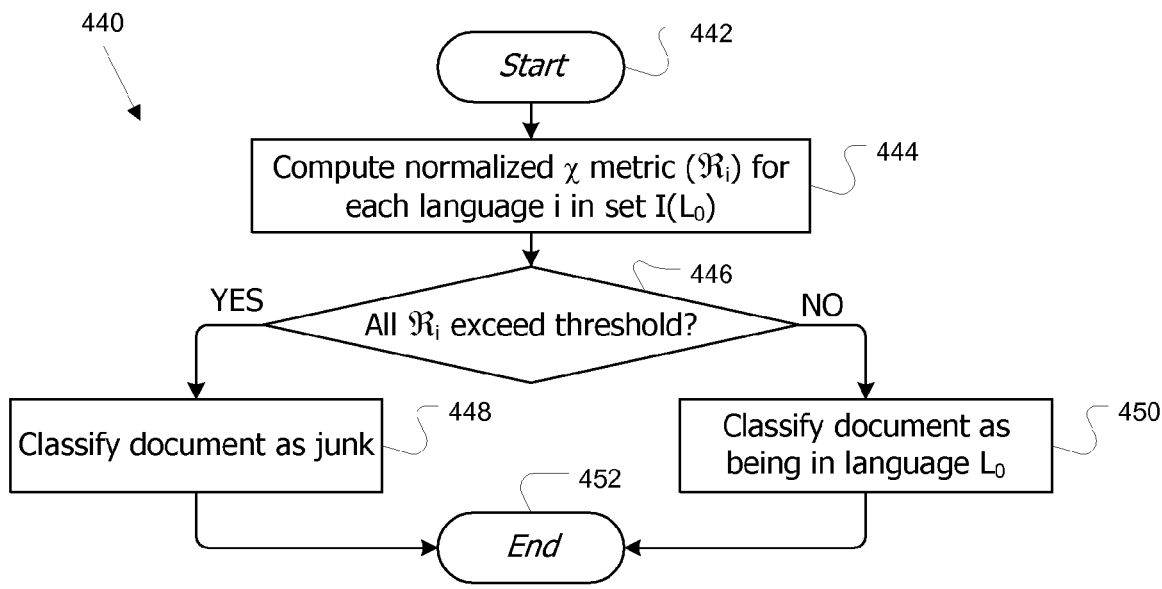

A third embodiment uses a likelihood ratio. FIG. 4C is a flow diagram of a process 440 for determining whether a document is junk according to another embodiment of the invention. Process 440 starts (block 442) with step 444, where a likelihood ratio $\Re_i$ is computed for each language $M_i$ in impostor set $I(L_O)$ for the most likely language $L_O$, e.g., according to:

$$\Re_i = \left( \frac{\hat{S}_{Mi}(D_T) - \mu_{Mi}^{L0}}{\sigma_{Mi}^{L0}} \right) \Big/ \left( \frac{\hat{S}_{L0}(D_T) - \mu_{L0}^{L0}}{\sigma_{L0}^{L0}} \right). \quad (10)$$

At step 446, each $\Re_i$ result of Eq. (10) is compared to a threshold value. In one embodiment, a threshold value of 1 is used; a different threshold can be set if desired.

At step 448, if the $\Re_i$ result of Eq. (10) for every language $M_i$ in impostor set $I(L_O)$ exceeds the threshold, then the document is classified as junk. Otherwise, at step 450, the document is classified as being in the most likely language $L_O$. Process 440 ends (block 452).

Referring again to FIG. 2, it will be appreciated that any one of processes 400, 420 or 440 can be used to implement steps 210 and 212 of process 200. Still other tests can also be used.

At step 214, the language identification information is stored. In one embodiment, for documents identified as being in language $L_O$, an identifier of language $L_O$ is stored as language information 130 in document information database 122 of FIG. 1. For documents identified as junk, a special value can be stored as language information 130; this value indicates that the document was analyzed and found to be junk (i.e., not in any language). In some embodiments, for documents identified as junk, an identifier of the most likely language $L_O$ can be stored along with an indication that the document is most likely not in any language. Process 200 ends (block 216).

It will be appreciated that the language identification process described herein is illustrative and that variations and modifications are possible. Steps described as sequential may be executed in parallel, order of steps may be varied, and steps may be modified or combined. As noted, different scoring models can be used. Any language for which a model is available can be considered as a candidate language; in some embodiments, the set of candidate languages can be reduced to speed up computation. For instance, if it is known that no documents are in Russian, then Russian need not be considered, even if a language model for Russian is available.

While the invention has been described with respect to specific embodiments, one skilled in the art will recognize that numerous modifications are possible. For example, particular scoring techniques described herein can be replaced with different techniques, and n-grams other than bigrams (e.g., trigrams) could be used if desired. Different bigrams, languages, or documents can be processed sequentially or in parallel. Further, the techniques described herein are not limited to n-gram based language models; they can be applied to dictionary-based models and other language models that use a score to represent the likelihood of a document being in a particular language.

In some embodiments, all documents are converted to a single "standard" character coding scheme prior to language analysis. A conventional character coding scheme, such as the well known 16-bit Unicode Transformation Format (UTF-16) encoding, can be selected as the standard. Such conversion simplifies the language models in that bigram frequency data (or other data) needs to be maintained for only one character coding scheme. Existing tools can be used or adapted to recognize other character coding schemes and convert them to the standard scheme. However, a particular character coding scheme is not required, and in some embodiments multiple coding schemes can be supported. Any type of document may be processed using the techniques described herein or similar techniques, provided only that the document is available or can be made available with a usable character coding.

Documents identified as junk using techniques described herein can be subject to further processing. For example, tools may be used or developed to distinguish among different types of junk documents (e.g., distinguishing computer source code from contact lists); alternatively, documents identified as junk may be directed to the attention of a human reviewer for further evaluation. As noted above, the identification of a document as junk does not imply an assessment of its potential value (or lack thereof); accordingly, in some embodiments, junk documents and associated document information are preserved along with the non-junk documents.

As described above, embodiments of the present invention may be implemented as computer programs. Such programs may be encoded on various computer readable media for storage and/or transmission; suitable media include magnetic disk or tape, optical storage media such as compact disk (CD) or DVD (digital versatile disk), flash memory, and the like. Computer readable media encoded with the program code may be packaged with a device (e.g., microprocessor) capable of executing the program or provided separately from such devices.

In addition, while the embodiments described above may make reference to specific hardware and software components, those skilled in the art will appreciate that different combinations of hardware and/or software components may also be used and that particular operations described as being implemented in hardware might also be implemented in software or vice versa.

Thus, although the invention has been described with respect to specific embodiments, it will be appreciated that the invention is intended to cover all modifications and equivalents within the scope of the following claims.

What is claimed is:

1. A method for identifying documents as not belonging to any language in a plurality of candidate languages wherein each candidate language has an associated language model, the method comprising:
   for each language in a plurality of candidate languages, computing, by a processor, a document score for a test document using the language model of that language;
   selecting a most likely language for the test document from the plurality of candidate languages based on the respective document scores for each language in the plurality of candidate languages;
   accessing an impostor profile for the most likely language, wherein the impostor profile for the most likely language includes a parameter set consisting of values characterizing a score distribution expected for documents in the most likely language when scored using the respective language models of one or more impostor languages in an impostor set associated with the most likely language;
   comparing the document scores for the one or more impostor languages in the impostor set associated with the most likely language to the impostor profile for the most likely language;
   determining whether the test document is in the most likely language or in no language based at least in part on a result of comparing the document scores; and
   storing, in a computer readable storage medium, language information for the test document, the language information including a result of the determination.

2. The method of claim 1 wherein the language model for each language in the plurality of candidate languages is a bigram based language model.

3. The method of claim 1 further comprising:
   for each language in the plurality of candidate languages, defining an impostor profile; and
   storing the impostor profile for each language in a computer database,
   wherein accessing the impostor profile for the most likely language includes reading the impostor profile from the computer database.

4. The method of claim 3 wherein defining the impostor profile for one of the languages (L) in the plurality of candidate languages includes:
   calculating, using the language model for an alternative language M that is not the language L, a respective alternative training score for each of a plurality of training documents in language L;
   calculating, using the language model for the language L, a respective true training score for each of the plurality of training documents;
   determining a degree of closeness between the alternative language M and the language L based on the alternative training scores for the alternative language M and the true training scores; and
   determining whether to include the alternative language M in the impostor set for the language L based at least in part on the degree of closeness between the alternative language M and the language L.

5. The method of claim 4 wherein determining the degree of closeness between the alternative language M and the language L includes comparing a mean of the alternative training scores for the alternative language M and a mean of the true training scores.

6. The method of claim 5 wherein the acts of calculating a respective alternative training score for each of the plurality of training documents and determining a degree of closeness between the alternative language M and the language L are performed for each of a plurality of alternative languages.

7. The method of claim 6 wherein determining whether to include one of the alternative languages in the impostor set for the language L is based on the respective degrees of closeness of each of the plurality of alternative languages to the language L.

8. The method of claim 7 wherein the number of impostor languages included in the impostor set for the language L is limited to a predetermined maximum number.

9. The method of claim 7 wherein the impostor set for the language L includes all of the alternative languages for which the degree of closeness meets a threshold condition.

10. The method of claim 1 wherein the parameter set for the impostor profile for the most likely language includes a respective mean and standard deviation characterizing the score distribution for each of the impostor languages in the impostor set for the most likely language.

11. The method of claim 10 wherein comparing the document scores for the one or more impostor languages in the impostor set associated with the most likely language to the impostor profile for the most likely language includes:
   applying a chi square test to the document score using the means and standard deviations of all of the impostor languages in the impostor set.

12. The method of claim 10 wherein comparing the document scores for the one or more impostor languages in the impostor set associated with the most likely language to the impostor profile for the most likely language includes:

applying a similarity test to the document score and each impostor language in the impostor set for the most likely language, wherein the similarity test is applied separately for each impostor language.

13. The method of claim 10 wherein comparing the document scores for the one or more impostor languages in the impostor set associated with the most likely language to the impostor profile for the most likely language includes:
applying a likelihood ratio test to the document score and each impostor language in the impostor set for the most likely language, wherein the likelihood ratio test is applied separately for each impostor language.

14. A computer program product comprising a computer readable storage medium encoded with program code usable to control operation of a computer system, the program code including:
program code for computing, for each language in a plurality of candidate languages, a document score for a test document using a language model associated with that language;
program code for selecting a most likely language from the plurality of candidate languages based on the document scores for each language;
program code for determining whether the test document is in the most likely language or in no language, wherein the determination is based at least in part on comparing the document scores for one or more impostor languages in an impostor set associated with the most likely language to an impostor profile for the most likely language,
wherein the impostor profile for the most likely language includes a parameter set consisting of values characterizing a score distribution expected for documents in the most likely language when scored using the respective language models of the one or more impostor languages in the impostor set associated with the most likely language; and
program code for storing, in a computer readable storage medium, language information for the test document, the language information including a result of the determination.

15. The computer program product of claim 14 wherein the language model for each language is a bigram based language model.

16. The computer program product of claim 14 further comprising:
program code for defining an impostor profile for a language L in the plurality of candidate languages and storing the impostor profile for the language L in a data store.

17. The computer program product of claim 16 wherein the program code for defining the impostor profile for the language L includes program code for analyzing a set of training documents known to be in the language L to determine an alternative score for each document in the set of training documents under the language model for a language other than the language L.

18. The computer program product of claim 17 wherein the program code for defining the impostor profile for the language L further includes program code for determining a degree of closeness between the language L and the language other than the language L based at least in part on the alternative scores for the documents in the set of training documents.

19. The computer program product of claim 18 the program code for defining the impostor profile for the language L provides that the number of languages included in the impostor set for the language L is limited to a predetermined maximum number.

20. The computer program product of claim 18 wherein program code for defining the impostor profile for the language L provides that the impostor set for the language L includes all languages in the plurality of candidate languages, other than the language L, for which the degree of closeness meets a threshold condition.

21. The computer program product of claim 14 wherein the parameter set for the impostor profile for the most likely language L0 includes a respective mean and standard deviation characterizing the score distribution for each of the languages in the impostor set for the most likely language L0.

22. The computer program product of claim 21 wherein the program code for determining whether the test document is in the most likely language or in no language includes program code for applying a chi square test to the document score using the means and standard deviations of the impostor language in the impostor set, wherein the determination whether the test document is in the most likely language or in no language is based at least in part on a result of the chi square test.

23. The computer program product of claim 21 wherein the program code for determining whether the test document is in the most likely language or in no language includes program code for applying a similarity test to the document score and each impostor language in the impostor set for the most likely language, wherein the similarity test is applied separately for each impostor language and wherein the determination whether the test document is in the most likely language or in no language is based at least in part on a result of the similarity test.

24. The computer program product of claim 21 wherein the program code for determining whether the test document is in the most likely language or in no language includes program code for applying a likelihood ratio test to the document score and each impostor language in the impostor set for the most likely language, wherein the likelihood ratio test is applied separately for each language M, and wherein the determination whether the test document is in the most likely language or in no language is based at least in part on a result of the likelihood ratio test.

25. A computer system comprising:
a non-transitory computer readable storage medium on which is provided a language model database to store a plurality of language models corresponding to a plurality of languages, each language model including information usable to determine a score reflecting a probability that a document is in the language corresponding to that language model,
the language model database being further to store an impostor profile associated with each of the plurality of languages, wherein the impostor profile for each of the plurality of languages includes a parameter set comprising values characterizing a score distribution expected for documents in that language when scored using the respective language models of one or more impostor languages in an impostor set associated with that language; and
control logic coupled to the language model database to compute, for at least some of the plurality of languages, a document score for a test document, the document score being computed based on at least some of the language models stored in the language model data store, and to select a most likely language for the test document based on the computed document scores, wherein document scores are also computed for the impostor languages in the impostor set associated with the most likely language, the control logic being further to compare the document scores computed for the impostor languages in the impostor set associated with the most likely language to the impostor profile for the most likely language and to determine whether the test document is in the most likely language or in no language based at least in part on a result of comparing the document scores.

26. The computer system of claim 25 further comprising:

a document information data store configured to store information about a plurality of documents including the test document, wherein the control logic is further configured to store, in the document information data store, language information for the test document, the language information including a result of the determination.

27. The computer system of claim 25 wherein the language models are n gram based language models.

28. The computer system of claim 25 wherein the control logic is further configured to define the impostor profile for each of the plurality of languages.

29. The computer system of claim 28 wherein the control logic is further configured such that defining the impostor profile for a first one of the plurality of languages includes analyzing a set of documents known to be in the first one of the plurality of languages to determine a score for each document in the set of documents under the language model for a language other than the first one of the plurality of languages.

30. The computer system of claim 25 wherein the control logic is further configured such that determining whether the test document is in the most likely language or in no language includes applying a chi square test to the computed document score for the most likely language and the respective computed document scores for the languages in the impostor set associated with the most likely language L0.

31. The computer system of claim 25 wherein the control logic is further configured such that determining whether the test document is in the most likely language or in no language includes applying a similarity test to the computed document score for the most likely language and the respective computed document scores for the languages in the impostor set associated with the most likely language.

32. The computer system of claim 25 wherein the control logic is further configured such that determining whether the test document is in the most likely language or in no language includes applying a likelihood ratio test to the computed document score for the most likely language and the respective computed document scores for the languages in the impostor set associated with the most likely language.

* * * * *